(12) United States Patent
Dadu et al.

(10) Patent No.: US 9,852,731 B2
(45) Date of Patent: *Dec. 26, 2017

(54) MECHANISM AND APPARATUS FOR SEAMLESS VOICE WAKE AND SPEAKER VERIFICATION

(71) Applicant: Intel Corporation, Santa Clara, CA (US)

(72) Inventors: Saurabh Dadu, Tigard, OR (US); Lakshman Krishnamurthy, Portland, OR (US); Francis M. Tharappel, Portland, OR (US); Prabhakar R. Datta, Portland, OR (US); Bryan R. Peebler, El Dorado Hills, CA (US); Michael E. Deisher, Hillsboro, OR (US); Mandar S. Joshi, Santa Clara, CA (US); Saurin Shah, Portland, OR (US); Brian K. Vogel, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/223,967

(22) Filed: Jul. 29, 2016

(65) Prior Publication Data

US 2017/0032784 A1 Feb. 2, 2017

Related U.S. Application Data

(63) Continuation of application No. 14/129,644, filed as application No. PCT/US2013/050144 on Jul. 11, 2013, now Pat. No. 9,445,209.

(51) Int. Cl.
*G10L 15/22* (2006.01)
*G06F 3/16* (2006.01)
(Continued)

(52) U.S. Cl.
CPC ............ *G10L 15/22* (2013.01); *G06F 1/3206* (2013.01); *G06F 1/3231* (2013.01);
(Continued)

(58) Field of Classification Search
CPC ......... G06F 3/167; G06F 21/32; G10L 17/22; H04R 29/004; H04R 1/08
(Continued)

(56) References Cited

U.S. PATENT DOCUMENTS 6,070,140 A 5/2000 Tran
6,073,102 A 6/2000 Block
(Continued)

FOREIGN PATENT DOCUMENTS

JP 10319991 12/1998
KP 100819928 3/2008

OTHER PUBLICATIONS

International Search Report and Written Opinion dated Apr. 25, 2014 for PCT Application No. PCT/US2013/050144.
(Continued)

*Primary Examiner* — Abul Azad
(74) *Attorney, Agent, or Firm* — Green, Howard & Mughal LLP.

(57) ABSTRACT

Technologies are described herein that allow a user to wake up a computing device operating in a low-power state and for the user to be verified by speaking a single wake phrase. Wake phrase recognition is performed by a low-power engine. In some embodiments, the low-power engine may also perform speaker verification. In other embodiments, the mobile device wakes up after a wake phrase is recognized and a component other than the low-power engine performs speaker verification on a portion of the audio input comprising the wake phrase. More than one wake phrases may be associated with a particular user, and separate users may
(Continued)

be associated with different wake phrases. Different wake phrases may cause the device transition from a low-power state to various active states.

20 Claims, 7 Drawing Sheets

(51) Int. Cl.
| | | |
|---|---|---|
| *G06F 1/32* | (2006.01) | |
| *G10L 17/22* | (2013.01) | |
| *H04R 1/08* | (2006.01) | |
| *H04R 29/00* | (2006.01) | |
| *G06F 21/32* | (2013.01) | |
| *G10L 15/28* | (2013.01) | |
| *G10L 19/00* | (2013.01) | |

(52) U.S. Cl.
CPC .......... *G06F 1/3287* (2013.01); *G06F 1/3293* (2013.01); *G06F 3/167* (2013.01); *G06F 21/32* (2013.01); *G10L 15/285* (2013.01); *G10L 17/22* (2013.01); *G10L 19/0018* (2013.01); *H04R 1/08* (2013.01); *H04R 29/004* (2013.01); *Y02B 60/121* (2013.01); *Y02B 60/1282* (2013.01); *Y02B 60/1289* (2013.01)

(58) Field of Classification Search
USPC .............. 704/270, 275; 455/404.1, 410, 411, 455/127.5, 343.1–343.6
See application file for complete search history.

(56) References Cited

U.S. PATENT DOCUMENTS

| | | |
|---|---|---|
| 6,829,493 B1 | 12/2004 | Hunzinger |
| 7,418,392 B1 | 8/2008 | Mozer |
| 9,020,823 B2 | 4/2015 | Hoepken et al. |
| 9,445,209 B2 * | 9/2016 | Dadu ...................... G06F 3/167 |
| 2006/0074658 A1 | 4/2006 | Chadha |
| 2009/0043580 A1 | 2/2009 | Mozer et al. |
| 2009/0307511 A1 | 12/2009 | Fiennes et al. |
| 2011/0070864 A1* | 3/2011 | Karam ................... G06F 21/34 455/411 |
| 2014/0244269 A1* | 8/2014 | Tokutake ................ G10L 15/00 704/275 |
| 2014/0278435 A1 | 9/2014 | Ganong et al. |
| 2014/0365225 A1 | 12/2014 | Haiut |

OTHER PUBLICATIONS

International Search Report on Patentability dated Jan. 21, 2016, for PCT Application No. PCT/US2013/050144.
Notice of Allowance for U.S. Appl. No. 14/129,644 dated May 10, 2016, 8 pages.
Office Action for U.S. Appl. No. 14/129,644 dated Jan. 4, 2016.
Office Action for Chinese Patent Application No. 20130077357.3, dated Jun. 7, 2017.

* cited by examiner

MECHANISM AND APPARATUS FOR SEAMLESS VOICE WAKE AND SPEAKER VERIFICATION

This application is a continuation of prior U.S. patent application Ser. No. 14/129,644, filed on 27 Dec. 2013 and titled "MECHANISM AND APPARATUS FOR SEAMLESS VOICE WAKE AND SPEAKER VERIFICATION", which was a National Stage of International Application No. PCT/US13/50144, filed 11 Jul. 2013 and titled "DEVICE WAKE AND SPEAKER VERIFICATION USING THE SAME AUDIO INPUT", both of which are incorporated by reference in their entireties.

BACKGROUND

Most modern computing devices enter a low-power state to preserve power in response to various events, such as a user not interacting with a device for a period of time. In order to "wake up" a device that is in a low-power state, a user typically has to physically interact with the device in some fashion. For example, a user may have to hit Ctrl-Alt-Delete on a keyboard, press a button on a remote control or smartphone, or unlock a touchscreen. In addition, a user typically has to interact with the device a second time as part of an authentication or verification process, such as by entering a passcode at a touchscreen, before the user is allowed to operate the device.

DETAILED DESCRIPTION

Figure 1:
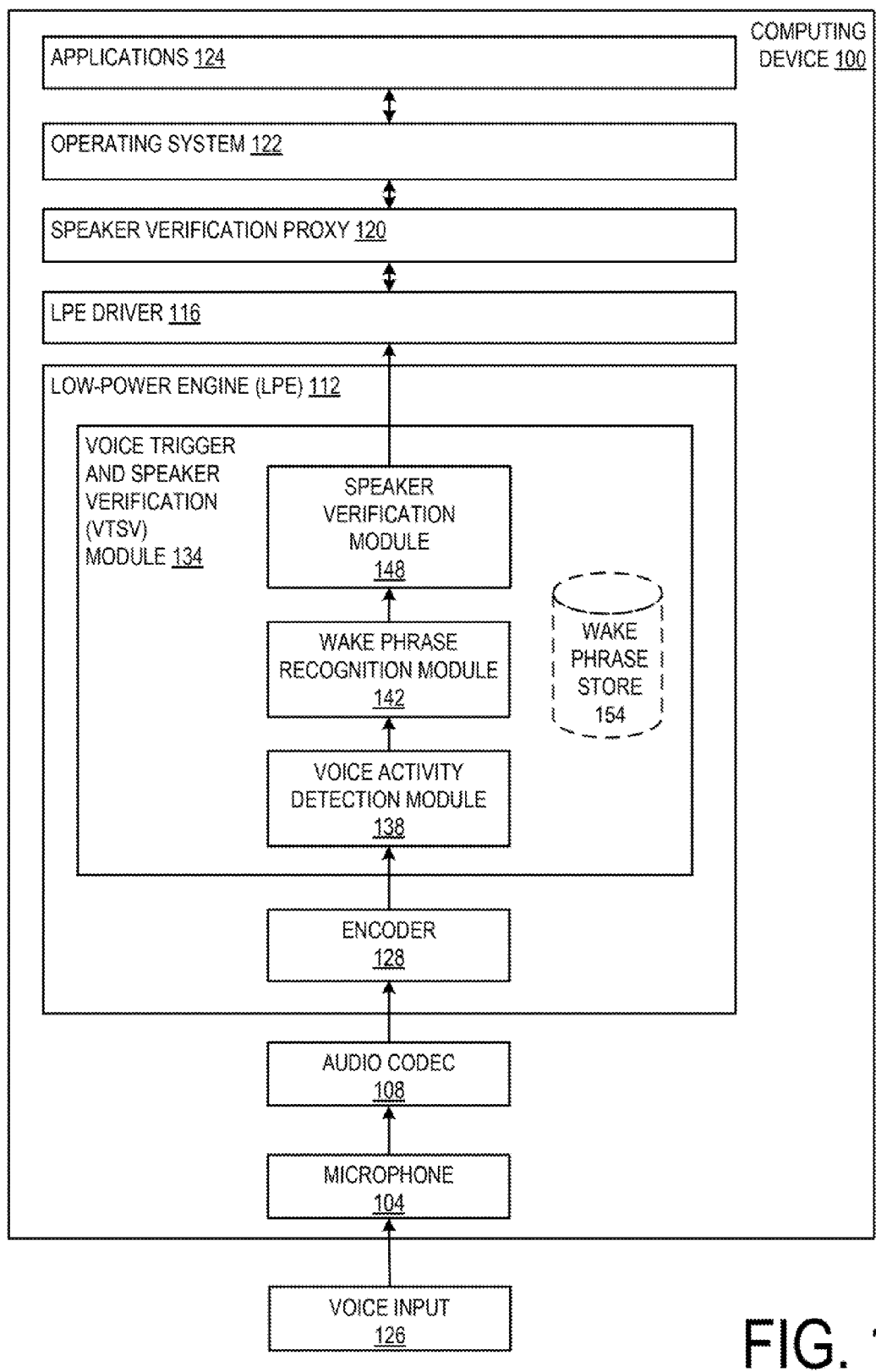
FIG. 1 is a block diagram of a first computing device that recognizes wake phrases and performs speaker verification using the same audio input.

The technologies disclosed herein allow a computing device to wake up from a low-power state and verify a user in response to the user speaking a single wake phrase. Thus, the device's user interface is made a more natural one by allowing the user to interact with the device in a more hands-free and eyes-free manner. When a device is in a low-power state, a low-power engine determines whether audio input received at the device comprises a person speaking a wake phrase. If a wake phrase is detected, the device then verifies the speaker using a portion of the audio input containing the wake phrase. Speaker verification may be performed by the low-power engine or by another component that is awakened after detection of a wake phrase.

As used herein, the terms "wake up" or "waking up" refer to the transition of a computing device or components of a computing device from a low-power state to an active state. A low-power state (e.g., a drowsy, sleep or hibernation state) is a state in which a computing device consumes less power than when operating in an active state. For example, a low-power state may be a state in which device components are disabled, or operate at a reduced clock frequency or supply voltage. For instance, a device operating in a low-power state may have its output display turned off or dimmed, or one or more of its processors operating at a scaled down frequency. Accordingly, an active state is a state in which a computing device consumes more power than when operating in a low-power state. Thus, waking up a device may comprise enabling an output display that has been turned off or scaling up a processor's operating frequency.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments may be practiced without these specific details. In other instances, well-known structures and devices are shown in block diagram form in order to facilitate a description thereof. The intention is to cover all modifications, equivalents, and alternatives within the scope of the claims.

FIG. 1 is a block diagram of a first computing device 100 that recognizes wake phrases and performs speaker verification using the same audio input. The computing de ice (device) 100 comprises a microphone 104, an audio codec 108, a low-power engine (LPE) 112, an LPE driver 116, a speaker verification proxy 120, an operating system 122 and one or more applications 124. The computing device 100 receives audio input 126 at the microphone 104, which generates audio signals that are delivered to the audio codec 108. The audio codec 108 in turn converts the audio signals to digital signals that are provided to the LPE 112.

The low-power engine 112 manages aspects of the capture audio pipeline in the device 100. The LPE 112 operates when the device is in a low-power state. In some embodiments, components of the LIT, 112 may also operate when the device is in an active state. In addition to being enabled when the device is in a low-power state, the LPE 112 may operate at a reduced frequency or supply voltage relative to that provided to other components when the device is in an active state. In some embodiments, the LPE 112 is a low-power DSP (Digital Signal Processor).

The LPE 112 comprises an encoder 128 that encodes digital audio signals generated by the audio codec 108, and a voice trigger and speaker verification (VTSV) module 134 that performs wake phrase recognition and speaker verification on received audio. The encoder 128 encodes the audio into a format that is usable by the VTSV module 134, such as PCM (Pulse Code Modulation). The VTSV module 134 comprises a voice activity detection module 138, a wake phrase recognition module 142, a speaker verification module 148 and, optionally, a wake phrase store 154. Typically, the VTSV module 134 is inserted into the audio capture pipeline when the device 100 enters a low-power state and is removed from the audio capture pipeline when the device 100 wakes up. In some embodiments, whether the VTSV module is inserted into the audio capture pipeline when the device transitions to a low-power state is determined based on user settings.

The VTSV module 134 determines whether the encoded audio input comprises a wake phrase and performs speaker verification on a portion of the audio input that comprises the wake phrase. All or a portion of the audio input 126 received at the microphone 104 may be passed to the VTSV module 134. For example, the microphone 104, the audio codec 108 and/or the encoder 128 may be configured to provide output to the next stage in the audio capture pipeline only if the input from the previous stage satisfies certain characteristics, such as the magnitude of the audio signal being above a threshold level. In other embodiments, the VTSV module 134 processes all audio input received at the microphone 104 when the device 100 is in a low-power state.

The voice activity detection module 138 determines whether the encoded audio comprises human speech. If so, portions of the audio input comprising the speech are passed to the wake phrase recognition module 142. The wake phrase recognition module 142 employs known speech recognition techniques to determine whether the audio input comprising speech contains a wake phrase.

A wake phrase is a word or phrase (e.g., "hey phone", "wake up", "hello") that may cause a computing device operating in a low-power state to wake up. In FIG. 1, a speaker is also verified before the computing device 100 wakes up. In other embodiments, the device wakes up after the detection of a wake phrase, and then performs speaker verification, as described below in regards to FIG. 2.

Computing devices may employ various wake phrase policies. For example, in some embodiments, different users may use the same wake phrase to wake a computing device. In other embodiments, a user may speak one of a plurality of wake phrases to wake a device. In yet other embodiments, various wake phrases may be associated with various users. For example, one or more wake phrases may be associated with a first user, and one or more second wake phrases may be associated with a second user. Further, different wake phrases may cause the computing device to transition from a low-power state to different active states, such as high performance, standard and low performance active states. The difference between such active states could be, for example, the number of device components or accessories that are enabled, the clock frequency at which components of the device operate, the supply voltage applied to components of the device, and the like. In some embodiments, wake phrases may be user programmable or configured by a computing device manufacturer.

The wake phrase recognition module 142 compares audio input against wake phrases accessible to the device, such as wake phrases stored in the wake phrase store 154. The wake phrase store 154 may further comprise indications of one or more users associated with the stored wake phrases. If the wake phrase recognition module 142 determines that the audio input comprises a wake phrase, the speaker verification module 148 verifies that the user who spoke the wake phrase is a user who is entitled to operate the device. In some embodiments, speaker verification is performed using known biometric analysis techniques. For example, the results of a biometric analysis performed on the audio input may be compared against biometric identifiers or other biometric-related information associated with users authorized to operate the computing device.

Speaker verification is performed on a portion of the audio input that comprises the wake phrase. Thus, speaker verification and wake phrase recognition are performed on the same audio input. For example, if the wake phrase recognition module 142 determines that the audio input comprises the wake phrase "hey phone", speaker verification is performed on a portion of the audio input comprising the "hey phone" wake phrase.

After the speaker has been verified to be a user for whom access to the device 100 is to be given, a notification that the device 100 is to be awakened is passed to the LPE driver 116. The LPE driver 116 passes the notification to the speaker verification proxy service 120. The proxy service 120 provides an event to the operating system 122 of the device 100 to unlock the device 100. The proxy service 120 may provide an event to the operating system 122 to take additional tasks, such as instructing the operating system 122 to begin monitoring the audio input 126 for commands or input to be performed or used by the one or more applications 124. In some embodiments, the VTSV module 134 is bypassed in the audio capture pipeline after the device has awakened.

Waking the device 100 after a speaker has been verified may reduce power consumption of the device 100. For example, power may be wasted if the device 100 is awakened in response to a user speaking a wake phrase, but the user is not verified.

Figure 2:
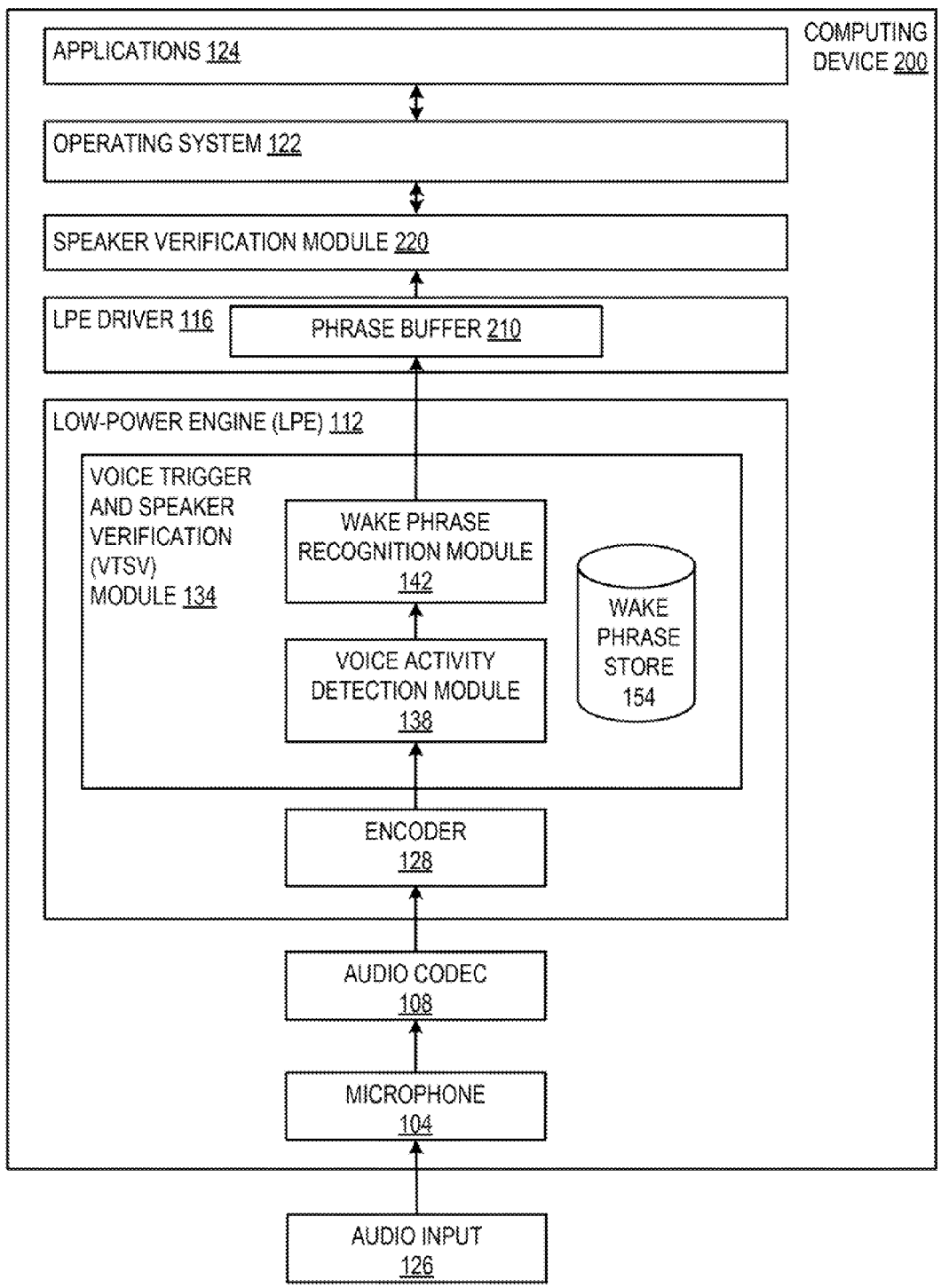
FIG. 2 is a block diagram of a second computing device that recognizes wake phrases and performs speaker verification using the same audio input.

FIG. 2 is a block diagram of a second computing device 200 that recognizes wake phrases and performs speaker verification using the same audio input. Device 200 has components in common with the device 100 in FIG. 1, but differs in that speaker verification functionality is performed by a speaker verification module 220 that is external to the low-power engine 112. In the device 200, when the wake phrase recognition module 142 detects a wake phrase in the audio input, the device 200 is awakened and an audio sample containing the wake phrase is copied to a phrase buffer 210 allocated by the LPE driver 116. The LPE driver 116 receives notification from the LPE 112 that a wake phrase has been detected and passes this notification to the speaker verification module 220. The speaker verification module 220 performs verification on the audio sample stored in the phrase buffer 210. If verification is successful, the verification module 220 provides an event to the operating system 122 to unlock the device 200. The verification module 220 may provide additional events to the operating system 122 to begin monitoring the audio input 126 for user commands or input to be supplied to the applications 124. In alternative embodiments of computing device 200, speaker verification may be performed by any component(s) of the device other than the low-power engine 112.

In some embodiments, a device may be awakened in stages. For example, if a low-power engine detects a wake phrase in the audio input, the low-power engine may cause one or more second components of the computing device to transition from a low-power state to an active state to perform the speaker verification. If the speaker is verified, one or more third components of the device (e.g., the remaining components of the computing device, or a subset thereof) may be awakened to brine, the computing device to an active state.

In some embodiments a wake phrase may be interpreted as a command to be performed by the device. Examples of such wake phrases include "show email," "send a message" and "I need directions". A computing device could interpret these wake phrases as commands and launch an email application, messaging application and navigation application, respectively, after being awakened.

In some embodiments, the device may perform speaker verification on a speech command that is provided by the user after the users speaks a wake phrase. For example, in response to a user speaking the phrase "Hey phone, send a message," the device may be awakened in response to detecting the wake phrase "Hey phone". The device may then perform speaker verification on "send a message", which it may also interpret as a command to launch a messaging application after the speaker has been verified. In some embodiments, the low-power engine may interpret audio input for a speech command. Alternatively, the low-power engine may perform wake phrase recognition, and pass a portion of the audio input containing a word or a phrase spoken after the wake phrase to the host operating system for speaker verification and command interpretation. Interpreting audio input for a speech command may be performed by a speech command interpretation module.

In still other embodiments, a device can be awakened after a wake phrase is recognized and without a user having been verified. A user may not have been verified either due to speaker verification based on received audio input not being performed by the low-power engine or because speaker verification failed. After being awakened, the computing device can interpret received audio input as a command to be executed by the computing device and perform the command if the command is a user agnostic command. In such embodiments, the low-power engine may pass at least a portion of the received audio input that does not comprise the wake phrase. This portion of the audio input can be provided to one or more components of the device that have been awakened, such as a command interpretation module.

A user agnostic command may be any command that does not require a user's identifying information or personal data, such as account information (e.g., user IDs, passwords and contacts for email, social media, financial institution and other accounts), device usage history (e.g., web browser history, cookies), calendar appointments and user preferences (e.g., movie, restaurant preferences associated with various applications executable by the device). Examples of user agnostic commands include commands that inquire about the weather at the device's present location, results of sporting events and stock prices. Example of commands that are not user agnostic include commands such as "read my email," "give me directions home" and "call Victoria".

In one example, a computing device operating in a low-power state can be awakened and execute a user agnostic command as follows. While visiting his friend John, Bob picks up John's smartphone and speaks the phrase "hey phone, what's the weather." John's smartphone, which is operating in a low-power mode due to John not having interacted with the phone for a while, recognizes the wake phrase "hey phone." The smartphone's attempt to verify Bob fails, as the smartphone does not recognize Bob, based on the audio input, as a user authorized to operate the phone. The smartphone is awakened and audio input comprising the phrase "what's the weather" is provided to the smartphone's command interpretation module. The command interpretation module recognizes this phrase to a be a user agnostic command, and accesses a cloud-based service that provides a weather forecast to Bob based on the computing device's present location. In some embodiments, the command interpretation module can provide audio input to a web-based service that determines whether a command included in received audio input is a user agnostic command.

If Bob speaks the phrase "hey phone, read my email", the phone (or a cloud-based service) can determine that "read my email" is not a user agnostic command and the smartphone will not execute the command (e.g., execute an email application, execute a web browser and navigate to a cloud-based web service).

It is to be understood that FIGS. 1 and 2 illustrate exemplary sets of modules and components that may be included in a computing device incorporating technologies described herein. In other embodiments, a computing device may have more or fewer modules or components than those shown in FIGS. 1 and 2. Further, separate modules may be combined into a single module, and single modules may be split into multiple modules. For example, the audio codec 108 and the encoder 128 could be combined into a single module. The voice activity detection module 138 and the wake phrase recognition module 142 could be merge into a single module as well.

The modules shown in FIGS. 1 and 2 may be implemented in software, hardware, firmware or combinations thereof. A computing device referred to as being programmed to perform a method may be programmed to perform the method via software, hardware, firmware or combinations thereof.

Figure 3:
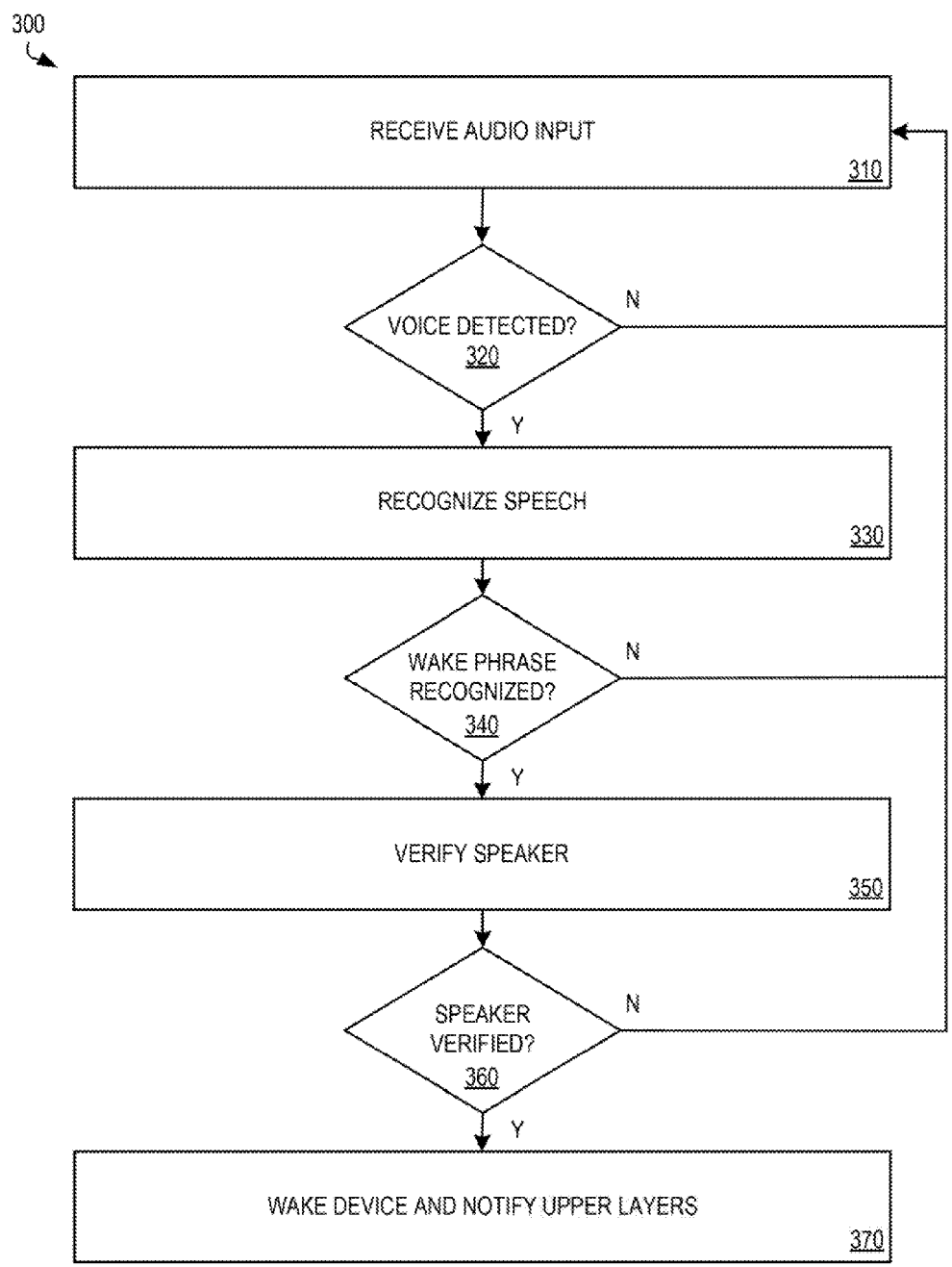
FIG. 3 is a flowchart of a first exemplary method of waking a computing device and performing speaker verification using the same audio input.

FIG. 3 is a flowchart of a first exemplary method 300 of waking a computing device and performing speaker verification using the same audio input. The method 300 may be performed by, for example, the computing device 100 shown in FIG. 1 operating in a low-power state. At process act 310, the device receives audio input. The audio input may be received at a built-in microphone. At process act 320, voice detection is performed on the audio input. In some embodiments, the audio input received at the microphone may undergo an analog-to-digital conversion and be encoded before voice detection is performed. Voice detection may be performed by a voice activity detection module. If voice is detected in the received audio input, any speech existing in the audio input is recognized at process act 330. At process act 340, it is determined whether the recognized speech comprises a wake phrase. Speech recognition and wake phrase recognition may be performed by a wake phrase recognition module.

If a wake phrase is recognized, speaker verification is performed at process act 350 and at process act 360, it is determined whether the speaker has been verified. Process acts 350 and 360 may be performed by a speaker verification module. If the speaker has been verified, the method 300 continues to process act 370, where the device is awakened. An indication that the speaker has been verified may also be passed to one or more upper layers operating system layer, application layers). If voice is not detected at 320, a wake phrase is not recognized at 340, or the speaker is not verified at process act, 360, the device remains in a low-power state, and the method 300 returns to process act 310 to receive further audio input.

Figure 4:
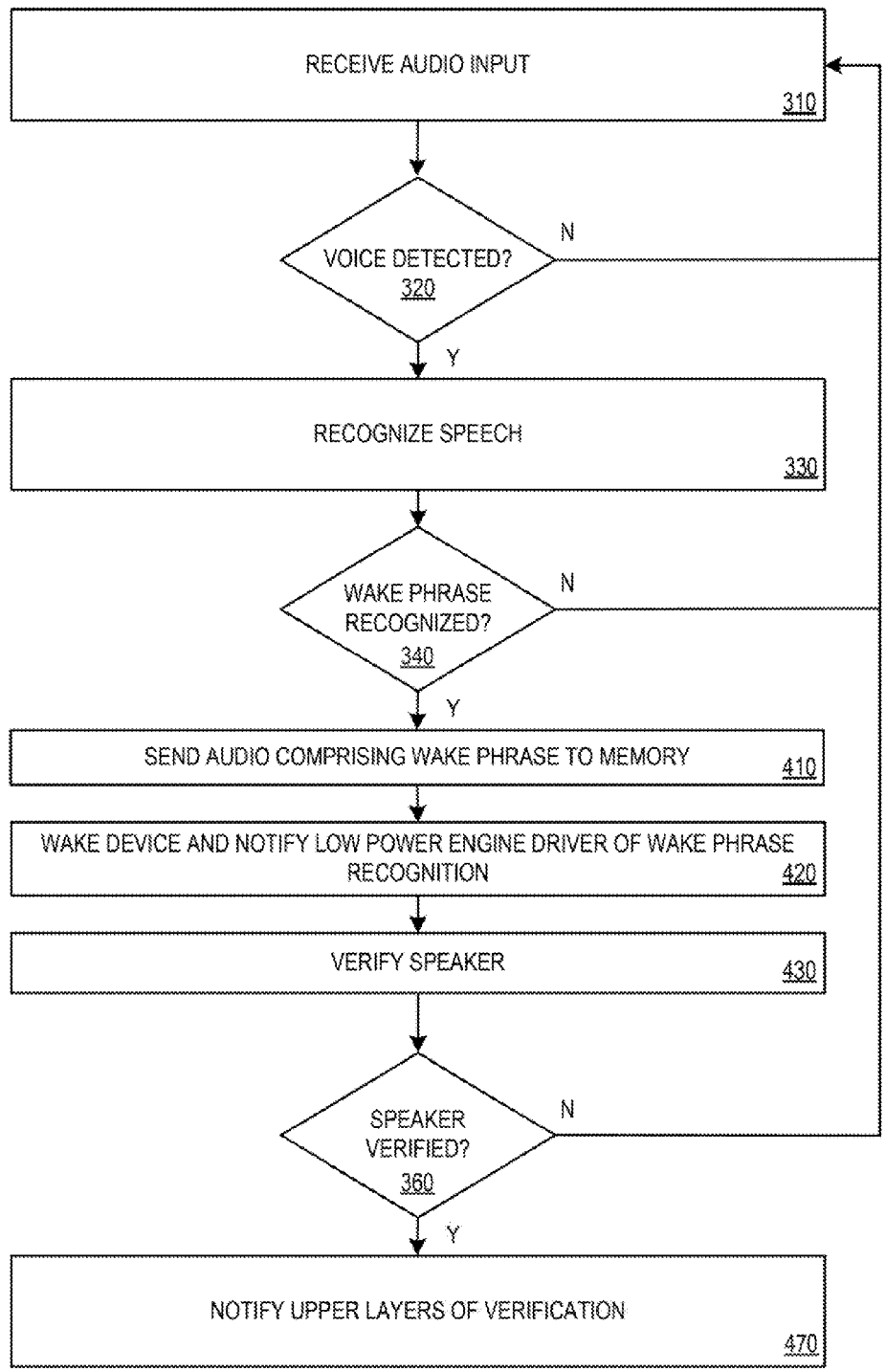
FIG. 4 is a flowchart of a second exemplary method of waking a computing device and performing speaker verification using the same audio input.

FIG. 4 is a flowchart of a second exemplary method 400 of waking a computing device and performing speaker verification using the same audio input. The method 400 may be performed by, for example, the computing device 200 shown in FIG. 2 operating in a low-power state. Process acts 310, 320, 330, 340 and 360 have been described above in regards to FIG. 3. If voice has been detected in received audio input, and speech has been recognized in the audio, the method 400 reaches process act 410. At process act 410, a portion of the audio input comprising the recognized wake phrase is transferred to memory (e.g., an audio buffer) accessible to device components that are currently disabled or otherwise in a low-power state. This may be done by the LPE 112 performing a direct memory access. At process act 420, the device is awakened and an upper-level component of the device, such as a speaker verification module, receives notification that a wake phrase has been recognized.

At process act 430, the speaker is verified using the portion of the audio input comprising the recognized wake phrase previously copied to memory. Speaker verification is performed after the device has been awakened, and is performed by a component other than the low-power component of the device that performed voice detection and wake phrase recognition. Speaker verification may be performed by, for example, a component of the host operating system operating on a host processor. If a speaker has been verified at process 360, upper layers (e.g., upper layers of the operating system, one or more application layers) are notified that a speaker has been verified at process act 470. If voice is not detected at 320, a wake phrase is not recognized at 340, or the speaker is not verified at 360, the device remains in a low-power state, and the method 400 returns to process act 310 to receive further audio input. In some embodiments, method 300 or 400 may have more or fewer process acts than those shown.

Figure 5:
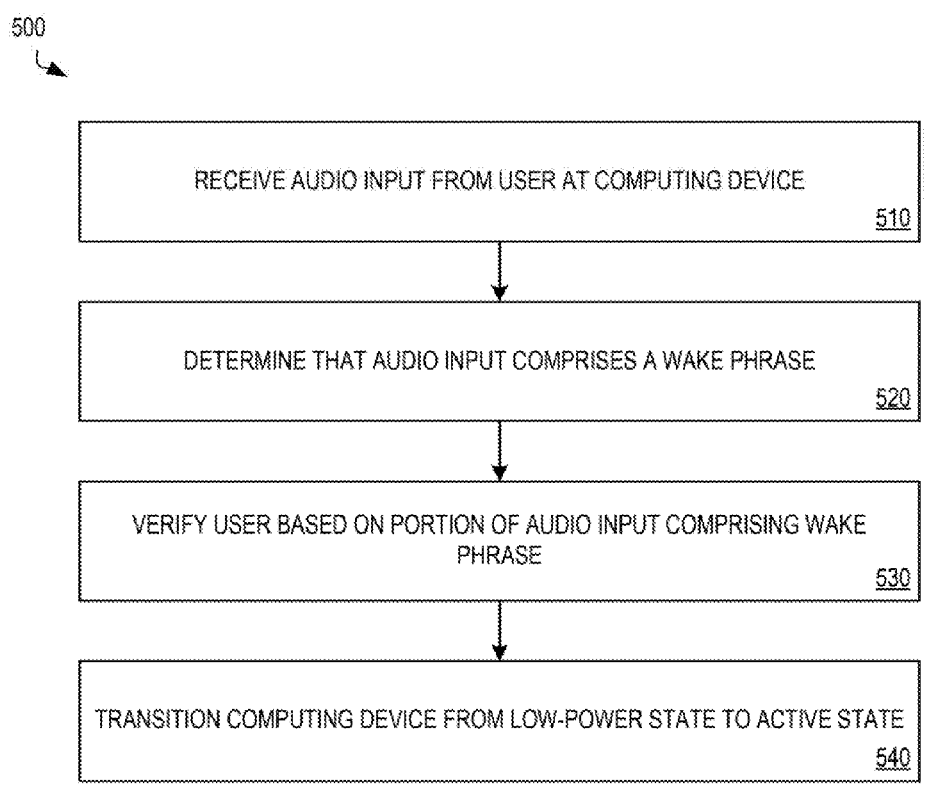
FIG. 5 is a flowchart of a third exemplary method of waking a computing device and performing speaker verification using the same audio input.

FIG. 5 is a flowchart of a third exemplary method 500 of waking a computing device and performing speaker verification using the same audio input. The method 500 may be performed by, for example, a smartphone that is in sleep state. In the sleep state, the touchscreen of the smartphone is turned off and one or more processors are disabled. The smartphone's audio capture pipeline remains operating and comprises a low-power engine that performs wake phrase recognition and speaker verification on audio input.

At process act 510, while the computing device is in a low-power state, the computing device receives audio input from a user at the computing device. In the example, a user speaks the wake phrase "hey phone" to the smartphone. At process act 520, the computing device, while still in a low-power state, determines that the audio input comprises a wake phrase. In the example, the low-power engine of the smart phone recognizes the wake phrase "hey phone" in the received audio input.

At process act 530, the user is verified based at least in part on a portion of the audio input comprising the wake phrase. In the example, the user is verified based on a portion of the audio input comprising the "hey phone" wake phrase. The smartphone verifies that the user is authorized to use the device by comparing the results of biometric analysis of the portion of the audio input comprising the wake phrase against biometric identifiers associated with users authorized to operate the device.

At process act 540, the computing device transitions from the low-power state to an active state. In the example, after the user is verified to be a user that is authorized to operate the device, the smartphone transitions from the sleep state to an active state by turning on the display and enabling the one or more processors. The user does not have to provide any additional audio input to gain access to the device. Thus, after providing the "hey phone" wake phrase, the user may be taken to a home screen or an application that was executing prior to the smartphone entering the sleep state.

The technologies described herein have at least the following exemplary advantages. By performing wake phrase recognition and speaker verification on the same audio input, a computing device presents a more simplified natural user interface to a user; the user may unlock the device and be verified in a hands-free and eyes-free manner. Thus, the user is relieved from having to speak a wake phrase and then having to provide an additional input (e.g., voice, touchscreen or keyboard input) for speaker verification. Further, device power consumption is reduced in embodiments where the device is awakened only after a speaker has been identified.

The technologies, techniques and embodiments described herein may be performed by any of a variety of computing devices, including mobile devices (e.g., smartphones, handheld computers, tablet computers, laptop computers, media players, portable gaming consoles, cameras and video recorders), non-mobile devices (e.g., desktop computers, servers, stationary gaming consoles, set-top boxes, smart televisions) and embedded devices (e.g., devices incorporated into a vehicle, home or place of business). As used herein, the term "computing devices" includes computing systems and includes devices comprising multiple discrete physical components.

Figure 6:
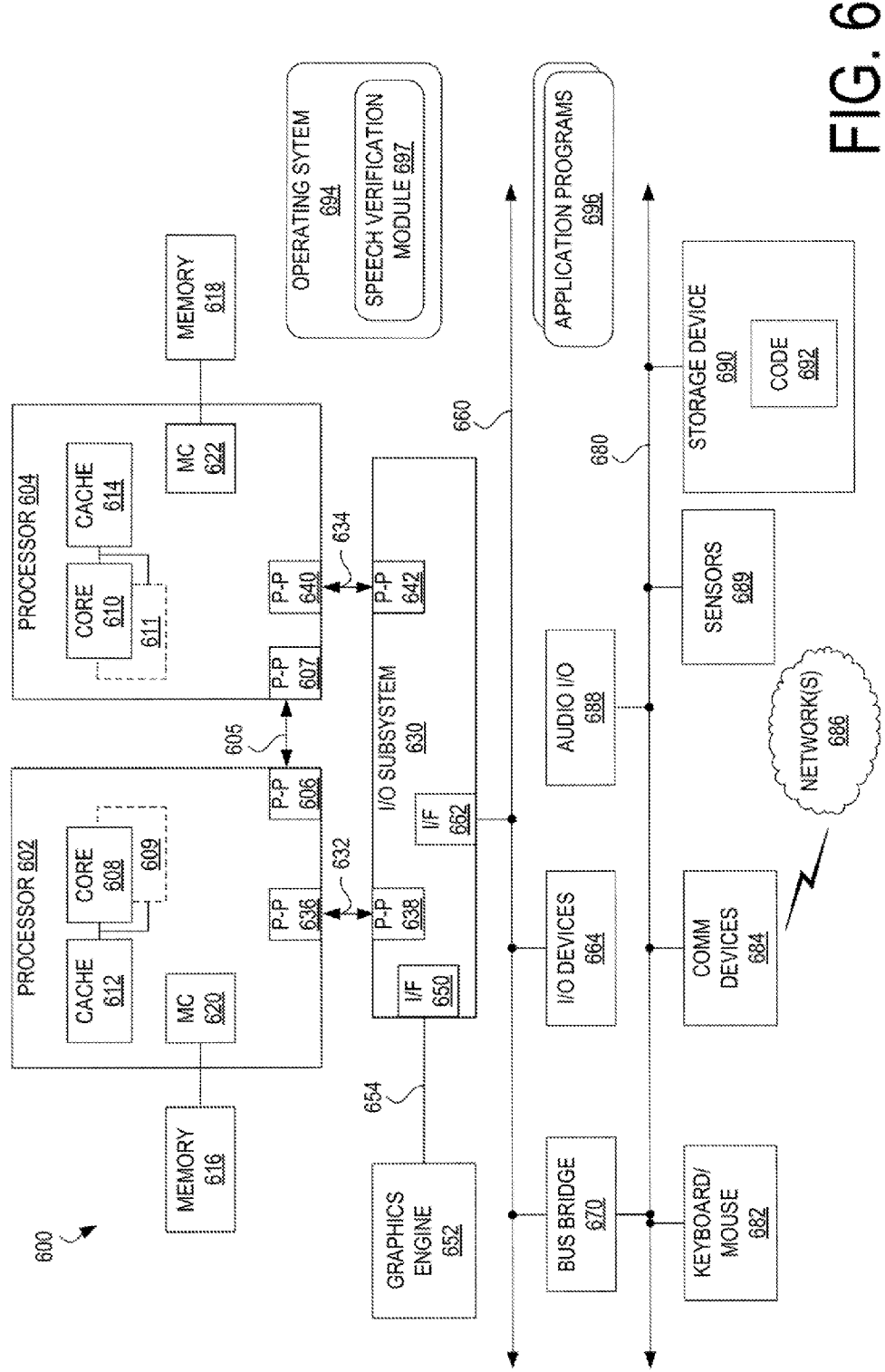
FIG. 6 is a block diagram of an exemplary computing device in which technologies described herein may be implemented.

FIG. 6 is a block diagram of an exemplary computing device in which technologies described herein may be implemented. Generally, components shown in FIG. 6 may communicate with other shown components, although not all connections are shown, for ease of illustration. The device 600 is a multiprocessor system comprising a first processor 602 and a second processor 604 and is illustrated as comprising point-to-point (P-P) interconnects. For example, a point-to-point (P-P) interface 606 of the processor 602 is coupled to a point-to-point interface 607 of the processor 604 via a point-to-point interconnection 605. It is to be understood that any or all of the point-to-point interconnects illustrated in FIG. 6 may be alternatively implemented as a multi-drop bus, and that any or all buses illustrated in FIG. 6 could be replaced by point-to-point interconnects.

As shown in FIG. 6, the processors 602 and 604 are multicore processors. Processor 602 comprises processor cores 608 and 609, and processor 604 comprises processor cores 610 and 611. Processor cores 608-611 may execute computer-executable instructions in a manner similar to that discussed below in connection with FIG. 7, or in other manners.

Processors 602 and 604 further comprise at least one shared cache memory 612 and 614, respectively. The shared caches 612 and 614 may store data (e.g., instructions) utilized by one or more components of the processor, such as the processor cores 608-609 and 610-611. The shared caches 612 and 614 may be part of a memory hierarchy for the device 600. For example, the shared cache 612 may locally store data that is also stored in a memory 616 to allow for faster access to the data by components of the processor 602. In some embodiments, the shared caches 612 and 614 may comprise multiple cache layers, such as level 1 (L1), level 2 (L2), level 3 (L3), level 4 (L4), and/or other caches or cache layers, such as a last level cache (LLC).

Although the device 600 is shown with two processors, the device 600 may comprise any number of processors. Further, a processor may comprise any number of processor cores. A processor may take various forms such as a central processing unit, a controller, a graphics processor, an accelerator (such as a graphics accelerator or digital signal processor (DSP)) or a field programmable gate array (FPGA). A processor in a device may be the same as or different from other processors in the device. In some embodiments, the device 600 may comprise one or more processors that are heterogeneous or asymmetric to a first processor, accelerator, FPGA, or any other processor. There may be a variety of differences between the processing elements in a system in terms of a spectrum of metrics of merit including architectural, microarchitectural thermal, power consumption characteristics and the like. These differences may effectively manifest themselves as asymmetry and heterogeneity amongst the processors in a system. In some embodiments, the processors 602 and 604 reside in the same die package.

Processors 602 and 604 further comprise memory controller logic (MC) 620 and 622. As shown in FIG. 6, MCs 620 and 622 control memories 616 and 618 coupled to the processors 602 and 604, respectively. The memories 616 and 618 may comprise various types of memories, such as volatile memory (e.g., dynamic random access memories (DRAM), static random access memory (SRAM)) or non-volatile memory (e.g., flash memory). While MCs 620 and 622 are illustrated as being integrated into the processors 602 and 604, in alternative embodiments, the MCs may be logic external to a processor, and may comprise one or more layers of a memory hierarchy.

Processors 602 and 604 are coupled to an Input/Output (I/O) subsystem 630 via P-P interconnections 632 and 634. The point-to-point interconnection 632 connects a point-to-point interface 636 of the processor 602 with a point-to-point interface 638 of the I/O subsystem 630, and the point-to-point interconnection 634 connects a point-to-point interface 640 of the processor 604 with a point-to-point interface 642 of the I/O subsystem 630. Input/Output subsystem 630 further includes an interface 650 to couple I/O subsystem 630 to a graphics engine 652, which may be a high-performance graphics engine. The I/O subsystem 630 and the graphics engine 652 are coupled via a bus 654. Alternately, the bus 654 could be a point-to-point interconnection.

Input/Output subsystem 630 is further coupled to a first bus 660 via an interface 662. The first bus 660 may be a Peripheral Component Interconnect (PCI) bus, a PCI Express bus, another third generation I/O interconnection bus or any other type of bus.

Various I/O devices 664 may be coupled to the first bus 660. A bus bridge 670 may couple the first bus 660 to a second bus 680. In some embodiments, the second bus 680 may be a low pin count (LPC) bus. Various devices may be coupled to the second bus 680 including, for example, a keyboard/mouse 682, audio I/O devices 688 and a storage device 690, such as a hard disk drive, solid-state drive or other storage device for storing computer-executable instructions (code) 692. The code 692 may comprise computer-executable instructions for performing technologies described herein. Additional components that may be coupled to the second bus 680 include communication device(s) 684, which may provide for communication between the device 600 and one or more wired or wireless networks 686 (e.g. Wi-Fi, cellular or satellite networks) via one or more wired or wireless communication links (e.g., wire, cable, Ethernet connection, radio-frequency (RF) channel, infrared channel, channel) using one or more communication standards (e.g., IEEE 802.11 standard and its supplements). In addition, the device 600 may comprise one or more sensors 689 that may detect motion of the device 600, such as accelerometers or a gyroscope.

The device 600 may comprise removable memory such as flash memory cards (e.g., SD (Secure Digital) cards), memory sticks, Subscriber Identity Module (SIM) cards). The memory in device 600 (including caches 612 and 614, memories 616 and 618 and storage device 690) may store data and/or computer-executable instructions for executing an operating system 694 and application programs 696. Example data includes web pages, text messages, images, sound files, video data, wake phrases, users associated with particular wake phrases, and biometric analysis results associated with particular users for speaker verification, or other data sets to be sent to and/or received from one or more network servers or other devices by the device 600 via one or more wired or wireless networks, or for use by the device 600. The device 600 may also have access to external memory (not shown) such as external hard drives or cloud-based storage.

The operating system 694 may control the allocation and usage of the components illustrated in FIG. 6 and support one or more application programs 696. The operating system 694 may comprise a speech verification module 697 that verifies that the user who speaks a wake phrase is authorized to operate the device. The operating system may further comprise a command interpretation module that interprets the wake phrase as a command to be performed by the device 600. The application programs 696 may include common mobile computing device applications (e.g., email applications, calendars, contact managers, web browsers, messaging applications) as well as other computing applications.

The device 600 may support various input devices, such as a touch screen, microphone, camera, physical keyboard, and trackball, and one or more output devices, such as a speaker and a display. Other possible input and output devices include piezoelectric and other haptic I/O devices. Any of the input or output devices may be internal to, external to or removably attachable with the device 600. External input and output devices may communicate with the device 600 via wired or wireless connections.

In addition, the computing device 600 may provide one or more natural user interfaces (NUIs). For example, the operating system 694 or applications 696 may comprise speech recognition logic as part of a voice user interface that allows a user to operate the device 600 via voice commands. Further, the device 600 may comprise input devices and logic that allows a user to interact with the device 600 via body, hand or face gestures. For example, a user's ham gestures may be detected and interpreted to provide input to a gaming application.

The device 600 may further comprise one or more communication components 684. The components 684 may comprise wireless communication components coupled to one or more antennas to support communication between the system 600 and external devices. The wireless communication components may support various wireless communication protocols and technologies such as Near Field Communication (NFC), Wi-Fi, Bluetooth, 4G Long Term Evolution (LTE), Code Division Multiplexing Access (CDMA), Universal Mobile Telecommunication System (UNITS) and Global System for Mobile Telecommunication (GSM). In addition, the wireless states may support communication with one or more cellular networks for data and voice communications within a single cellular network, between cellular networks, or between the mobile computing device and a public switched telephone network (PSTN).

The device 600 may further include at least one input/output port (which may be, for example, a USB, IEEE 1394 (FireWire), Ethernet and/or RS-232 port) comprising physical connectors; a power supply; a proximity sensor; compass; and a satellite navigation system receiver, such as a GPS receiver. A GPS receiver may be coupled to a GPS antenna. The device 600 may further include one or more additional antennas coupled to one or more additional receivers, transmitters and/or transceivers to enable additional functions.

It is to be understood that FIG. 6 illustrates one exemplary computing device architecture. Computing devices based on alternative architectures may be used to implement technologies described herein. For example, instead of the processors 602 and 604, and the graphics engine 652 being located on discrete integrated circuits, a computing device may comprise a SoC (system-on-a-chip) integrated circuit incorporating multiple processors, a graphics engine and additional components. Further, a computing device may connect elements via bus or point-to-point configurations different from that shown in FIG. 6. Moreover, the illustrated components in FIG. 6 are not required or all-inclusive, as shown components may be removed and other components added in alternative embodiments.

Figure 7:
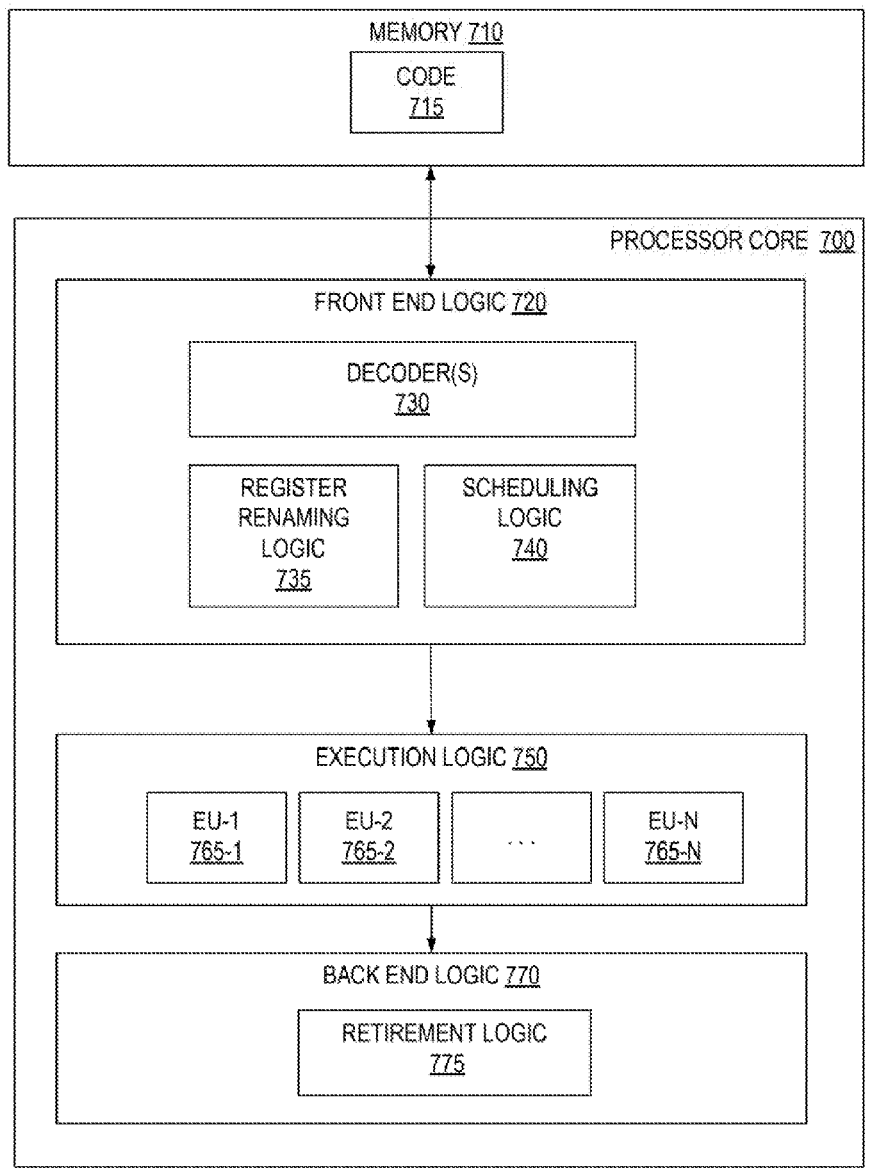
FIG. 7 is a block diagram of an exemplary processor core that may execute computer-executable instructions as part of implementing technologies described herein.

FIG. 7 is a block diagram of an exemplary processor core 700 to execute computer-executable instructions as part of implementing technologies described herein. The processor core 700 may be a core for any type of processor, such as a microprocessor, an embedded processor, a digital signal processor (PSP) or a network processor. The processor core 700 may be a single-threaded core or a multithreaded core in that it may include more than one hardware thread context (or "logical processor") per core.

FIG. 7 also illustrates a memory 710 coupled to the processor 700. The memory 710 may be any memory described herein or any other memory known to those of skill in the art. The memory 710 may store computer-executable instruction 715 (code) executable by the processor core 700.

The processor core comprises front-end logic 720 that receives instructions from the memory 710. An instruction may be processed by one or more decoders 730. The decoder 730 may generate as its output a micro operation such as a fixed width micro operation in a predefined format, or generate other instructions, microinstructions, or control signals, which reflect the original code instruction. The front-end logic 720 further comprises register renaming logic 735 and scheduling logic 740, which generally allocate resources and queues operations corresponding to converting an instruction for execution.

The processor core 700 further comprises execution logic 750, which comprises one or more execution units (EUs) 765-1 through 765-N. Some processor core embodiments may include a number of execution units dedicated to specific functions or sets of functions. Other embodiments may include only one execution unit or one execution unit that may perform a particular function. The execution logic 750 performs the operations specified by code instructions. After completion of execution of the operations specified by the code instructions, back-end logic 770 retires instructions using retirement logic 775. In some embodiments, the processor core 700 allows out of order execution but requires in-order retirement of instructions. Retirement logic 770 may take a variety of forms as known to those of skill in the art (e.g., re-order buffers or the like).

The processor core 700 is transformed during execution of instructions, at least in terms of the output generated by the decoder 730, hardware registers and tables utilized by the register renaming logic 735, and any registers (not shown) modified by the execution logic 750. Although not illustrated in FIG. 7, a processor may include other elements on an integrated chip with the processor core 700. For example, a processor may include additional elements such as memory control logic, one or more graphics engines, I/O control logic and/or one or more caches.

Referring back to FIG. 6, the network 686 may provide various cloud-based services that may be used to implement technologies described herein. For example, wake phrases and biometric-related information associated with individual users may be provided by a cloud-based service. In some embodiments, wake phrase recognition may be performed by a low-power engine locally at a device and a portion of the audio input comprising the wake phrase may be sent to a cloud-based service for speaker verification after the device has been awakened. That is, speaker verification may be performed remotely.

Any of the disclosed methods may be implemented as computer-executable instructions or a computer program product. Such instructions may cause a computer to perform any of the disclosed methods. Generally, as used herein, the term "computer" refers to any computing device or system described or mentioned herein, or any other computing device. Thus, the term "computer-executable instruction" refers to instructions that may be executed by any computing device described or mentioned herein, or any other computing device.

The computer-executable instructions or computer program products as well as any data created and used during implementation of the disclosed technologies may be stored on one or more tangible computer-readable storage media, such as optical media discs (e.g., DVDs, CDs), volatile memory components (e.g. DRAM, SRAM), or non-volatile memory components (e.g., flash memory, disk drives). Computer-readable storage media may be contained in computer-readable storage devices such as solid-state drives, USB flash drives, and memory modules. Alternatively, the computer-executable instructions may be performed by specific hardware components that contain hardwired logic for performing all or a portion of disclosed methods, or by any combination of computer-readable storage media and hardware components.

The computer-executable instructions may be part of, for example, a dedicated software application or a software application that is accessed via a web browser or other software application (such as a remote computing application). Such software may be executed, for example, on a single computing device or in a network environment using one or more network computers. Further, it is to be understood that the disclosed technology is not limited to any specific computer language or program. For instance, the disclosed technologies may be implemented by software written in C++, Java, Perl, JavaScript, Adobe Flash, or any other suitable programming language. Likewise, the disclosed technologies are not limited to any particular computer or type of hardware. Certain details of suitable computers and hardware are known and need not be set forth in detail in this disclosure.

Furthermore, any of the software-based embodiments (comprising, for example, computer-executable instructions for causing a computer to perform any of the disclosed methods) may be uploaded, downloaded or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

As used in this application and in the claims, a list of items joined by the term "and/or" may mean any combination of the listed items. For example, the phrase "A, B and/or C" may mean A; B; C; A and B; A and C; B and C; or A, B and C. As used in this application and in the claims, a list of items joined by the term "at least one of" may mean any combination of the listed terms. For example, the phrases "at least one of A, B or C" may mean A; B; C; A and B; A and C; B and C; or A, B and C.

The disclosed methods, apparatuses and systems are not to be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it is to be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

The follow examples pertain to additional embodiments of technologies disclosed herein.

Example 1

A computing device, comprising: a microphone; and a low-power engine to: recognize a wake phrase in audio input provided by a user to the microphone while the computing device is in a low-power state; verify the user based at least in part on a portion of the audio input comprising the wake phrase while the computing device is in the low-power state; and cause the computing device to transition from the low-power state to an active state.

Example 2

The computing device of Example 1 wherein the low-power engine is to cause the computing device to transition from a low-power state to an active state after recognizing a wake phrase in the audio input provided by a user to the microphone while the computing device is in a low-power state and after verifying a user based at least in part on a portion of the audio input comprising the wake phrase while the computing device is in the low-power state.

Example 3

The computing device of Example 1 wherein the low-power engine is to cause the computing device to transition from a low-power state to an active state after recognizing a wake phrase in the audio input provided, by a user to the microphone while the computing device is in a low-power state and after verification of a user based at least in part on a portion of the audio input comprising the wake phrase while the computing device is in the low-power state has failed; the computing device further comprising a command interpretation module to interpret a second portion of the audio input as a command to be executed by the computing device and to instruct the computing device to execute the command if the command is a user agnostic command, the second portion of the audio input not comprising the wake phrase.

Example 4

A computing device, comprising: a microphone; a low-power engine to: recognize a wake phrase in audio input provided by a user to the microphone while the computing device is in a low-power state; and cause the computing device to transition from the low-power state to an active state; and a speaker verification module to verify the user based at least in part on a portion of the audio input comprising the wake phrase, the speaker verification module being enabled when the computing device is in the active state and being disabled when the computing device is in the low-power state.

Example 5

The computing device of Example 1 or 4, further comprising a wake phrase store comprising a plurality of wake phrases associated with one or more users.

Example 6

The computing device of Example 1 or 4, further comprising a command interpretation module to interpret the portion of the audio input comprising the wake phrase as a command to be performed by the computing device.

Example 7

The computing device of Example 1 or 4, wherein the active state is based at least in part on the wake phrase.

Example 8

The computing device of Example 1 or 4, wherein the low-power engine is included in an audio capture pipeline of the computing device when the computing device is in the low-power state and the low-power engine is removed from the audio capture pipeline when the computing device is in the active state.

Example 9

A computing device, comprising: a means for receiving audio input from a user; a means for determining that the audio input comprises a wake phrase while the computing device is in a low-power state; a means for verifying the user based at least in part on a portion of the audio input comprising the wake phrase; and a means for transitioning the computing device from the low-power state to an active state.

Example 10

The computing device of Example 9, wherein the means for verifying the user verifies the user while the computing device is in a low-power state.

Example 11

A method of waking a computing device, comprising: while the computing device is in a low-power state: receiving audio input from a user at the computing device; and determining that the audio input comprises a wake phrase; transitioning the computing device from the low-power state to an active state; and verifying the user based at least in part on a portion of the audio input comprising the wake phrase.

Example 12

The method of Example 11, wherein the verifying is performed while the computing device is in the low-power state and the transitioning is performed if the audio input comprises a wake phrase and a user has been verified based at least in part on the portion of the audio input comprising the wake phrase.

Example 13

The method of Example 11, wherein the verifying is performed while the computing device is in the low-power state and the transitioning is performed if the audio input comprises a wake phrase and a user has not been verified based at least in part on the portion of the audio input comprising the wake phrase; the method further comprising: interpreting a second portion of the audio input as a command to be executed by the computing device, the second portion of the audio input not comprising the wake phrase; and performing the command at the computing device if the command is a user agnostic command.

Example 14

The method of Example 11, wherein the transitioning the computing device from the low-power state to the active state occurs prior to the verifying the user based at least in part on the portion of the audio input comprising the wake phrase.

Example 15

The method of Example 11, wherein the wake phrase is one of a plurality of wake phrases that may be used to verify the user.

Example 16

The method of Example 11, wherein the wake phrase is one of a plurality of wake phrases that may be used to verify a plurality of users, the plurality of wake phrases comprising a first wake phrase that may be used to verify a first user and a second wake phrase that may be used to verify a second user, the first wake phrase being different from the second wake phrase.

Example 17

The method of Example 11, wherein the determining that the audio input comprises a wake phrase and the verifying the user are performed by a low-power engine of the computing device.

Example 18

The method of Example 11, wherein the determining that the audio input comprises a wake phrase is performed by a low-power engine of the computing device, and the verifying the user is performed by one or more components of the computing device other than the low-power engine.

Example 19

The method of Example 11, wherein: the transitioning the computing device from the low-power state to the active state comprises transitioning one or more second components of the computing device to an active state; the verifying the user is performed by the one or more second components; and the transitioning the computing device from the low-power state to the active state further comprises transitioning one or more third components of the computing device from a low-power state to an active state.

Example 20

The method of Example 11, further comprising: interpreting the audio input comprising the wake phrase as a command to be executed by the computing device; and performing the command at the computing device.

Example 21

The method of Example 11, wherein the transitioning comprises transitioning to an active state based at least in part on the wake phrase.

Example 22

One or more computer-readable storage media storing computer-executable instructions for causing a computing device to perform any one of the methods of Examples 11-21.

Example 23

An apparatus comprising a means to perform any one of the method of Examples 11-21.

We claim:
1. A computing device, comprising:
a microphone;
a low-power engine to:
  recognize a wake phrase in audio input provided by a user to the microphone while the computing device is in a low-power state; and
  cause the computing device to transition from the low-power state to an active state after recognition of the wake phrase in the audio input provided by the user to the microphone while the computing device is in the low-power state;
a speaker verification module to:
  attempt to verify the user based at least in part on a first portion of the audio input comprising the wake phrase while the computing device is in the low-power state or the active state; and
a command interpretation module to:
  interpret a second portion of the audio input not comprising the wake phrase as a command to launch an application on the computing device and to launch the application when the command is a user agnostic command or not launch the application when the command is not a user agnostic command, wherein a user agnostic command comprises a command that does not require identifying information or personal data of the user.

2. The computing device of claim 1, wherein a user agnostic command comprises a command that does not require user identifying information.

3. The computing device of claim 1, wherein the attempt to verify the user is in the low-power state and the low-power engine is to cause the computing device to transition from the low-power state to the active state after the attempt to verify the user has failed.

4. The computing device of claim 1, wherein the low-power engine is to cause the computing device to transition from a second low-power state to a second active state after recognition of the wake phrase in a second audio input provided by a second user to the microphone while the computing device is in the second low-power state and after verification of the second user based at least in part on a portion of the second audio input comprising the wake phrase while the computing device is in the second low-power state.

5. The computing device of claim 4, wherein the command interpretation module is to interpret the first portion of the second audio input comprising the wake phrase as a second command to be performed by the computing device.

6. The computing device of claim 1, wherein the low-power engine is included in an audio capture pipeline of the computing device when the computing device is in the low-power state and the low-power engine is removed from the audio capture pipeline when the computing device is in the active state.

7. The computing device of claim 1, wherein the command interpretation module is to access a cloud-based service to determine information corresponding to the user agnostic command.

8. A method of waking a computing device, comprising:
while the computing device is in a low-power state:
receiving audio input from a user at the computing device; and
determining that the audio input comprises a wake phrase;
transitioning the computing device from the low-power state to an active state if the audio input comprises the wake phrase;
while the computing device is in the low-power state or the active state:
attempting to verify the user based at least in part on a first portion of the audio input comprising the wake phrase; and
while the computing device is in the active state:
interpreting a second portion of the audio input not comprising the wake phrase as a command to launch an application on the computing device; and
launching the application at the computing device when the command is a user agnostic command or not launching the application when the command is not a user agnostic command, wherein a user agnostic command comprises a command that does not require identifying information or personal data of the user.

9. The method of claim 8, wherein a user agnostic command comprises a command that does not require user identifying information.

10. The method of claim 8, wherein said attempting to verify the user is performed when the computing device in the low-power state and said transitioning the computing device from the low-power state to the active state is after said attempting to verify the user has failed.

11. The method of claim 8, wherein the wake phrase is one of a plurality of wake phrases that may be used to verify the user.

12. The method of claim 8, wherein the wake phrase is one of a plurality of wake phrases that may be used to verify a plurality of users, the plurality of wake phrases comprising a first wake phrase that may be used to verify a first user and a second wake phrase that may be used to verify a second user, the first wake phrase being different from the second wake phrase.

13. The method of claim 8, further comprising:
interpreting a second audio input comprising the wake phrase as a second command to be executed by the computing device; and
performing the second command at the computing device.

14. The method of claim 8, further comprising:
accessing a cloud-based service to determine information corresponding to the user agnostic command.

15. One or more non-transitory computer-readable storage media storing computer-executable instructions for causing a computing device to:
while the computing device is in a low-power state:
receive audio input from a user at the computing device; and
determine that the audio input comprises a wake phrase;
transition the computing device from the low-power state to an active state if the audio input comprises the wake phrase;
while the computing device is in the low-power state or the active state:
attempt to verify the user based at least in part on a first portion of the audio input comprising the wake phrase; and
while the computing device is in the active state:
interpret a second portion of the audio input not comprising the wake phrase as a command to launch an application on the computing device; and
launch the application at the computing device when the command is a user agnostic command or not launch the application when the command is not a user agnostic command, wherein a user agnostic command comprises a command that does not require identifying information or personal data of the user.

16. The one or more computer-readable storage media of claim 15, wherein a user agnostic command comprises a command that does not require user identifying information.

17. The one or more computer-readable storage media of claim 15, wherein said attempting to verify the user is performed when the computing device in the low-power state and said transitioning the computing device from the low-power state to the active state is after said attempting to verify the user has failed.

18. The one or more computer-readable storage media of claim 15, wherein the wake phrase is one of a plurality of wake phrases that may be used to verify a plurality of users, the plurality of wake phrases comprising a first wake phrase that may be used to verify a first user and a second wake phrase that may be used to verify a second user, the first wake phrase being different from the second wake phrase.

19. The one or more computer-readable storage media of claim 15, further comprising computer-executable instructions for causing the computing device to:
interpret a second audio input comprising the wake phrase as a second command to be executed by the computing device; and
perform the second command at the computing device.

20. The one or more computer-readable storage media of claim 15, further comprising computer-executable instructions for causing the computing device to:

access a cloud-based service to determine information corresponding to the user agnostic command.

\* \* \* \* \*